United States Patent
Dubeau

(10) Patent No.: US 8,653,470 B2
(45) Date of Patent: Feb. 18, 2014

(54) NEUTRON ENERGY SPECTROMETER

(75) Inventor: Jacques Dubeau, Gatineau (CA)

(73) Assignee: 3833364 Canada Inc., Gatineau (CA)

(*) Notice: Subject to any disclaimer, the term of this patent is extended or adjusted under 35 U.S.C. 154(b) by 982 days.

(21) Appl. No.: 12/758,493

(22) Filed: Apr. 12, 2010

(65) Prior Publication Data
US 2011/0049380 A1    Mar. 3, 2011

Related U.S. Application Data

(60) Provisional application No. 61/239,375, filed on Sep. 2, 2009.

(51) Int. Cl.
*G01T 3/00* (2006.01)

(52) U.S. Cl.
USPC ............................. 250/390.07; 250/390.01

(58) Field of Classification Search
USPC ................................ 250/390.07, 390.01
See application file for complete search history.

(56) References Cited

U.S. PATENT DOCUMENTS

| | | | |
|---|---|---|---|
| 3,102,198 A | | 8/1963 | Bonner et al. |
| 4,749,520 A | * | 6/1988 | Meininger et al. ............ 588/3 |
| 4,760,266 A | * | 7/1988 | Schulz .................. 250/390.01 |
| 5,278,417 A | | 1/1994 | Sun |

FOREIGN PATENT DOCUMENTS

| | | |
|---|---|---|
| JP | 2-82188 | 3/1990 |
| JP | 3-82985 | 4/1991 |
| JP | 5-134049 | 5/1993 |
| JP | 2008-025037 | 2/2008 |
| JP | 2008-026037 * | 2/2008 |

OTHER PUBLICATIONS

Bramblett, R.L., "A New Type of Neutron Spectrometer," Nuclear Instruments and Methods, 9; pp. 1-12 (1960).
Burgett, E.A., "A Broad Spectrum Neutron Spectrometer Utilizing a High Energy Bonner Sphere Extension," Thesis, Georgia Institute of Technology, May 2008.
Ing, H et al. "Rospec—A Simple Reliable High Resolution Neutron Spectrometer," Radiation Protection Dosimetry, 70(1-4); pp. 273-278 (1997).

(Continued)

*Primary Examiner* — David Porta
*Assistant Examiner* — Mindy Vu
(74) *Attorney, Agent, or Firm* — Pearl Cohen Zedek Latzer Baratz LLP

(57) ABSTRACT

A neutron spectrometer is disclosed, which consists of a Helium-3 proportional counter connected by cable to signal and data processing circuits, and a series of moderator shells and moderator lids. The series of cylindrical moderator shells are designed to fit within one another, like Russian Matryoshka dolls, with the counter at the center. Small air gaps are introduced between the shells so that removal of one shell from another is facilitated. The counter is placed within the smallest cylindrical moderator shell, and then a circular lid matching the smallest shell is placed on the opening of the first shell to close the first shell. This first closed shell is then placed within a second shell, which shell is closed with its corresponding circular lid. The cable is routed through the series of shells. A method for using the invention is also disclosed, wherein the counter reading is taken from the fully-assembled neutron spectrometer. Then the outer cylindrical shell and circular lid pair is removed, and another measurement of the counter is recorded. This is continued until the last shell is removed, and a measurement is recorded using the bare counter.

15 Claims, 5 Drawing Sheets

(56) References Cited

OTHER PUBLICATIONS

Howell, R.M et al. "Measurement of High-Energy Neutron Spectra with a Bonner Sphere Extension System," Nuclear Technology, 168, pp. 333-339 (Nov. 2009).

Leake, J.W., "An Improved Spherical Dose Equivalent Neutron Detector," Nuclear Instruments and Methods, 63; pp. 329-332, (1968).

Vega-Carrillo, H.R., "Response matrix of a multisphere neutron spectrometer with an 3He proportional counter," Revista Mexicana De Fisica, 51(1); pp. 47-52 (Feb. 2005.

Wiegel, B., "NEMUS—The PTB Neutron Multisphere Spectrometer: Bonner spheres and more," Nuclear Instruments and Methods in Physics Research, 476; pp. 36-41 (2002).

\* cited by examiner

NEUTRON ENERGY SPECTROMETER

CROSS-REFERENCE TO RELATED APPLICATIONS

This application claims priority to prior provisional application No. 61/239,375, filed on Sep. 2, 2009, which is incorporated by reference herein in its entirety.

FIELD OF THE INVENTION

The present invention relates generally to the field of radiation measurement and specifically to neutron energy spectrometry at nuclear power reactor sites and other types of installations where neutrons can be present.

BACKGROUND OF THE INVENTION

Inside reactor buildings, neutrons can have energies ranging over 9 orders of magnitude, from 25 meV (thermal energies) to 20 MeV. Neutrons interact with nuclei of the atoms inside the human body and may present a significant health risk to workers working in environments where these neutral particles are found. Neutrons can also be found at accelerator sites and around natural and man-made radiation sources.

For greater worker safety, radiation safety officers must, on a regular basis, characterize the neutron fields inside the nuclear power plants using elaborate and heavy instruments. The measurements provided by these instruments are essential in mapping "hot" areas inside a reactor building and can assist in determining if the personal dosimeters in service fulfill adequately the monitoring needs. The amount of biological damage suffered by an exposed individual is dependent on the energy per unit tissue mass imparted by the incoming neutrons, i.e. the radiation dose, multiplied by a weighting factor that depends on the incident neutron energy. The product of the dose and the weighting factor is called the dose equivalent. Because the weighting factor can range from 1 to 20 it is imperative that the neutron energy be measured if the dose equivalent cannot be measured directly.

Many neutron detection and dosimetry techniques and neutron energy characterization methods have been devised over the years. The following paragraphs provide a description of prior attempts to address the problem of determining the neutron spectra. These include simple thermal neutron counters, neutron dosimeters and neutron spectrometry systems.

Simple thermal neutron counters are devices that count the low energy neutrons with a certain efficiency. These devices are commercially available and any of them can be used as part of the invention. Included in the category of "simple" neutron counters are the following three examples. These describe the best available options to be used in the invention because of their high neutron counting efficiencies. However others are possible. The prior art on simple neutron counters includes the following.

U.S. Pat. No. 3,102,198 to Bonner (1963) describes the now commonly used and commercially available Helium-3 gas proportional counter. This proportional counter uses Helium as a gas but enriched with the Helium-3 isotope. This gas offers a high detection efficiency for thermal neutron through the $^3He(n,p)^3H$ nuclear reaction.

Boron trifluoride is also used as a gas in a proportional counter similar to the one described above. The gas is designated as $^{10}BF_3$, as it is highly enriched in $^{10}B$. This isotope of Boron offers a high detection efficiency for thermal neutrons through the $^{10}B(n,\alpha)^7Li$ reaction.

$^6LiI(Eu)$ is a scintillator that detects thermal neutrons through the $^6Li(n,\alpha)^3H$ reaction with a high efficiency. Energy from the nuclear reaction is converted to light photons and detected with a light detector.

Prior art on neutron dosimeters methods include the following. The Anderson-Braun and Leake detectors are two types of neutron dosimeter for the measurement of the dose equivalent without resorting to the prior measurement of the neutron energy spectrum. They consist of a thermal neutron detector surrounded by a shell of moderator, usually made of plastic such as polyethylene, of about 25 cm in diameter. Incident energetic neutrons are slowed down through collisions with the hydrogen atoms present in the moderator. When they reach thermal energies, the neutrons are then efficiently detected by the thermal neutron detector at the centre of the moderator. The device is a useful dosimeter in the range of 25 meV to 20 MeV but presents an inaccuracy in response of up to a factor of 5. Such instruments are calibrated to give neutron dose equivalent but do not provide neutron energy information. The size of the moderator is fixed.

The tissue equivalent proportional counter, the so-called Rossi-counter, is a spherical proportional counter, usually of 5 to 12 cm in diameter, whose external shell is made of conductive plastic and which is filled with a counting gas that has nearly the same atomic composition as human muscle. Incident neutrons interact with the walls of the detector and secondary charged particles enter the gas and their specific energy loss is measured. This device is an "energy loss spectrometer" which provides no information on the incident neutron energy but which allows the neutron dose equivalent to be determined for neutron of energies in excess of 100 keV.

U.S. Pat. No. 5,278,417 to Sun describes a spherical detector surrounded by perforated shells of different types of moderator (polyethylene, lead and borated polyethylene) to allow the spherical dosimeter to provide dose equivalent in the GeV range of energies. All shells are all present at once and are not removable. The device is also not a neutron energy spectrometer.

Prior art on spectrometry systems include the following. Hing et al. describe a proton recoil spectrometer, a transportable instrument consisting of one or more gas detectors, which deduces the neutron energies from the energy imparted to protons of the counting gas inside the detector. This system provides very good energy resolution of the neutrons. However, it responds only to neutrons above a few 10's of keV and the sensitivity is lower than that of a thermal neutron counter surrounded by a moderator. From the energy spectrum, other quantities of interest, such as the dose equivalent, can be found using conversion factors such as those published in ICRP report 74. This system consists of more than one neutron counter and does not directly make use of a moderator layer.

Two patents, one by Mikio (1991) and the other by Masahiro (2008), describe a thermal neutron detector embedded inside concentric hollow spherical shells. The energy response of both systems can be changed by filling or emptying the different hollow shells with moderating material. In the first of the two patents, the proposed moderating material is a liquid while in the second case it is powder. The shells are fixed, only their content is changed. The invention proposed herein does not call upon the filling and emptying of fixed shells and is more practical for use in an operational setting.

Bramblett et al. describe a neutron spectrometer commonly referred to as Bonner Sphere System. The full spectrum from 25 meV to 20 MeV is deduced from the count rates measured by a thermal neutron detector inside polyethylene spheres of radii from 3 inches to 15 inches. Typically 7 to 12 spheres are used. The user must insert the detector into each spheres in turn and takes as many measurements as there are spheres. From the energy spectrum, other quantities of interest, such as the dose equivalent, can be found using conversion factors such as those published in ICRP report 74. The Bonner Sphere System provides the most valuable information, for the following reasons: 1) it provides full energy spectra in the range of energies of 25 meV to 20 MeV, 2) it is a sensitive instrument that counts up to 1000 times faster than a proton recoil spectrometer. The disadvantages of the Bonner Sphere System are the following: 1) it is heavy: the full set of polyethylene spheres can weigh as much as 25 kg, 2) it is large: transport of the equipment may require 40 L of carrying capacity, 3) the data analysis is laborious: the conversion of the acquired data into neutron energy spectra requires the intervention of an expert user. The basic design of the Bonner Sphere system has not changed in over 45 years, as evidenced by a publication by Vega-Carrillo et al. However, recent work by Howell et al. has aimed to extend the sensitivity of the Bonner Sphere System to near 1 GeV by surrounding one of the moderating spheres with concentric shells of high atomic number material such as copper, tungsten and lead. A Bonner Sphere System with an extended energy range can be used in applications of neutron spectrometry in space, high altitude air travel and around particle accelerators.

Therefore, there is a need for a neutron spectrometer, wherein the spectra may be determined using a device that is less bulky, heavy and awkward than the "Bonner Spheres"-type spectrometer in the art, yet retaining the high sensitivity and wide energy response qualities which are so beneficial and attractive in this type of spectrometer.

SUMMARY OF THE INVENTION

The neutron spectrometer disclosed consists of a low-energy neutron counter surrounded by multiple removable shells of moderator material. The thickness of the moderator around the counter can be varied by adding or removing shells, which fit around the counter like cylindrical "Russian" dolls. By varying the moderator's thickness, the device is made to respond preferentially to neutrons of different energies. The data acquisition is controlled by a personal computer, which receives data from the counter. A data analysis procedure, performed on the personal computer or manually allows the energy distribution of the incident neutrons to be deduced. Cylindrically shaped moderator shells allow the moderator assembly to be designed in a "Russian doll" configuration where the thermal neutron counter and smaller moderator shells are inserted into the larger moderator shells and provides multiple benefits over the traditional Bonner Sphere System for the routine measurement of neutron radiation fields inside nuclear reactors or at other locations where neutrons are encountered.

In a preferred embodiment, the neutron spectrometer consists of a Helium-3 proportional counter connected by cable to signal and data processing circuits, and a series of moderator shells and moderator lids. The series of cylindrical moderator shells are designed to fit within one another, like Russian Matryoshka dolls, with the counter at the center. The counter is placed within the smallest cylindrical moderator shell, and then a circular lid matching the smallest shell is placed on the opening of the first shell to close the first shell. This first closed shell is then placed within a second shell, which shell is closed with its corresponding circular lid. The cable is routed through the series of shells, preferably through the lids. A method for using the invention is also disclosed wherein the counter reading is taken from the fully-assembled neutron spectrometer, after which the outer cylindrical shell and circular lid pair is removed, and another measurement of the counter is recorded. This process of removing shell and lid pairs, and recording counter measurements, is continued until the last shell is removed, and a measurement is recorded using the bare counter.

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

Figure 1:
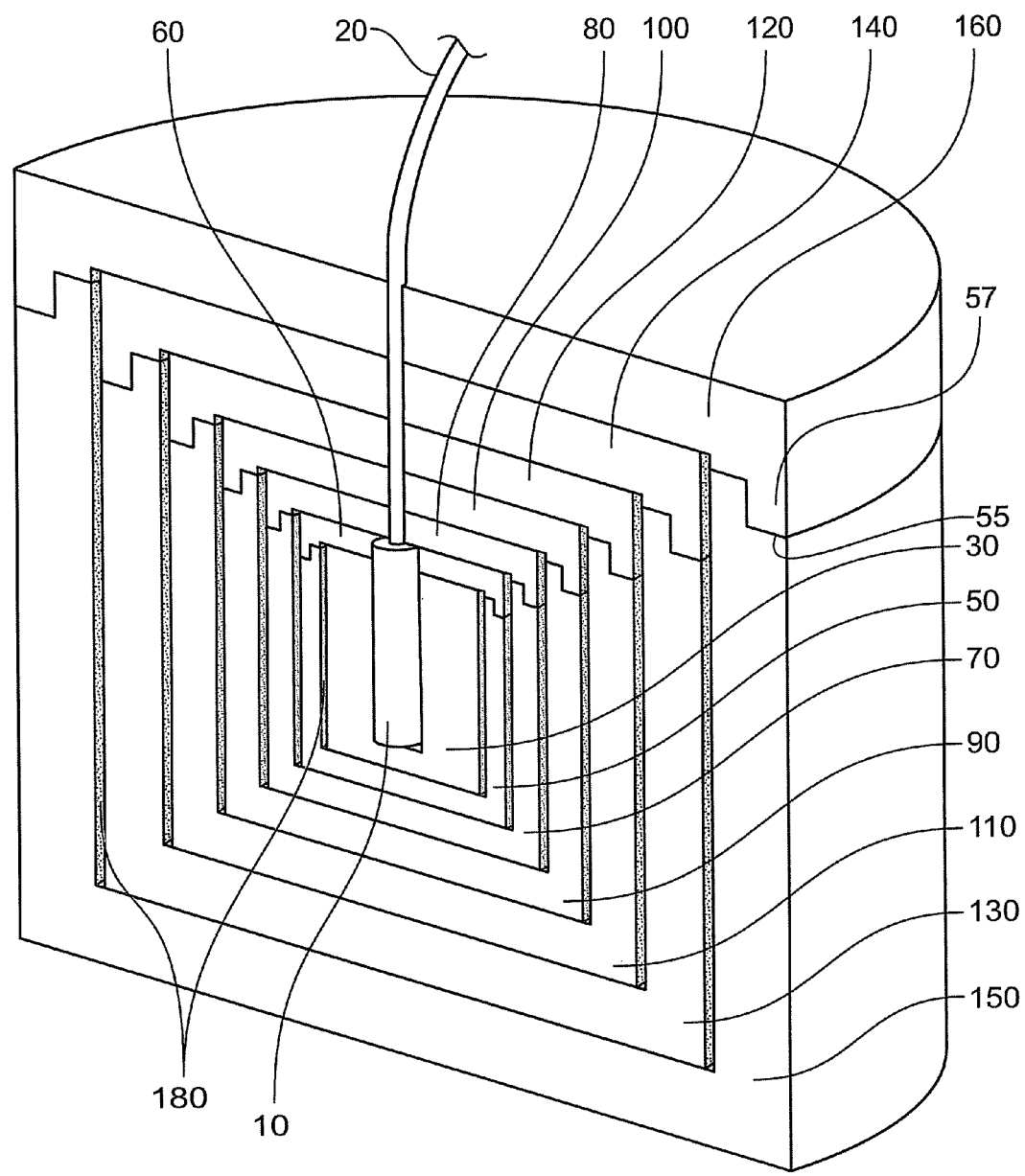
FIG. 1 is a perspective cut-away view of the assembled neutron spectrometer, according to one embodiment of the present invention.

With reference to FIG. 1 and according to one embodiment of the present invention, the neutron spectrometer consists of a cylindrical Helium-3 proportional counter 10, and a set of cylindrical moderator shells and a set of matching moderator lids. One skilled in the art would know that many other thermal neutron detectors may be substituted for said counter 10 and achieve the same result, and that thermal neutron detectors with a sensitivity of 1 to 100 count/s/nv (i.e. counting volume of 4 to 40 cm$^3$) provide adequate sensitivity for radiation protection applications. He/she would also know that, in very high neutron fields where active thermal neutron counters are susceptible to pulse pile-up, passive detectors such as thermoluminescent detectors (TLD) or activation foils could be used as thermal neutron flux integrators. The counter 10 is surrounded by a multitude of cylindrical moderator shells, each of which has a lid, and each of which, with corresponding lid, fits within the next-larger shell and lid. The counter 10 is at the center of the spectrometer, and its pulse signal is routed to the external signal processing electronics by a small diameter shielded coaxial cable 20.

The counter 10 and signal cable 20 are encased in a first hollow cylindrical moderator shell 30. The counter 10 and cable 20 may be removed from the first moderator shell 30, if desired. The first moderator shell 30 may be placed within the second cylindrical moderator, and the top of the first shell 30 will be flush with the top of the second moderator shell 50, such that the second moderator lid 60 may fit on top and close the second shell 50. The counter 10 protrudes through the second moderator lid 60, however the cable 20 is routed through the center of all further lids 80, 100, 120, 140 160. The moderator shell 50 has a groove 55 around the circumference of its opening that is approximately half of the thickness of moderator shell 50. Moderator lid 60 corresponds to the opening of moderator shell 50 and has a lip 57 corresponding to the groove 55 of moderator shell 50, so that the moderator lid 60 fits within the moderator shell 50 in a positive way, with the lip 57 engaging groove 55.

One skilled in the art would appreciate that there are other ways for cylindrical moderator shells to be closed, and that the above groove 55 and lip 57 form is merely one manner in which to close the shell with its lid. For instance, in other embodiments there may be two or more pins (not shown) attached to the moderator lid, which protrude in a downward direction and engage with corresponding holes on the top of the moderator shell. Further, one skilled in the art would appreciate that in other embodiments the cylinder may be closed in a manner other than a lid. For instance, the hollow cylindrical moderator shell may be composed of two halves of a hollow cylinder, each half closed on one end, which halves are joined together around the next-smaller cylindrical moderator shell.

This pattern of hollow cylindrical moderator shells and disc-shaped moderator lids may continue up to eleven pairs of shells and lids. In the depicted seven-shell spectrometer, eight combinations are possible. First, the counter 10 on its own; second, the counter 10 within the first shell 30; as a third combination, the counter 10 within the first shell 30, which is in turn within the second shell and lid pair 50, 60; as a fourth combination, the third combination within the third shell and lid pair 70, 80; as a fifth combination, the fourth combination within the further shell and lid pair 90, 100; as a sixth combination, the fifth combination within the fifth shell and lid pair 110, 120; as a seventh combination, the sixth combination within the sixth shell and lid pair 130, 140; and as an eighth combination, the seventh combination within the seventh shell and lid pair 150, 160. In another embodiment, the first shell 30 may be replaced by a shell and lid pair, analogous to the other shell and lid pairs.

Each smaller pair of cylindrical moderator shell and moderator lid fits within the next-larger pair, much like Russian nested dolls (Matryoshka dolls). The fit between pairs of shells and lids is very snug, so as to permit only limited airspaces 180, the size of which is determined by the manufacturing process. Permitting a small airspace 180, rather than no airspace at all, facilitates removal of the smaller pair of shell and lid from a larger shell. Small air gaps of the order of 1 mm are allowed between each cylindrical moderating shells to facilitate the assembly and disassembly of the different moderator configurations. This airspace 180 facilitates the sliding of a smaller cylinder into a larger one. However, there is no or only minimal airspace 180 at the flat end of the cylinder because it is neither required nor desirable in that location. The presence of air gaps between shells allows the easy removal and insertion of the moderating shells one inside the other. A system with nested hollow cylinders, that operates in this way, allows the result of a lighter and more compact system than the multi-sphere Bonner Sphere System. The use of spherical shells, rather than cylindrical shells, is an alternate embodiment of the present neutron spectrometer. However, while effective, this embodiment is not as practical, in an operational setting, as the proposed neutron spectrometer in the above embodiment. Furthermore, a system with nested hollow cylinders may allow the mechanized addition or removal of moderating shells, thus allowing the spectrometer to perform neutron spectrometry in an automated fashion.

The walls of the shells are of uniform thickness, and the sizes of the shells correspond with the most desirable energy and angular response for obtaining radiation measurements. The walls of the shells may be varied in thickness to favor counts in other energy levels, in a custom manner or as different sets of shells which complement each other. The fully assembled system, in one embodiment of the present invention, will have external dimensions of about 22 cm in diameter and 22 cm in length. The system will then be easily portable.

The shells are made of hydrogen rich plastic material such as polyethylene, Polyoxymethylene (Delrin™) or nylon. The length and the internal and external diameters of each cylindrical shells are such that a smaller shell can be inserted into the next largest in a "Russian doll" fashion. In this way, the user can easily assemble a thermal neutron spectrometer surrounded by varying amount of moderator. For all possible configurations of moderator, it is part of the design of the neutron spectrometer that the external length and diameter of moderator provide a neutron response that is nearly isotropic with the angle of incidence of the neutrons. A small aperture for cable routing at the center of each of the lids must be provided at one of the flat ends of the cylindrical moderator. This may possibly disrupt the angular response for neutrons incident near this aperture. Such a limitation, however, is present in all detectors surrounded by a moderator, and the tolerance of the reading takes this into account. The moderating assembly could consist of 7 cylindrical moderator assemblies of polyethylene of density of 0.92 to 0.96 g/cc. A lesser or greater number of shells could be used to reduce or augment the energy resolution of the system. Other dimensions and a different number of moderating shells are possible and part of the neutron spectrometer so long as the diameter to length ratio preserves the angular isotropic response. Also, other moderating material could be used to construct the cylindrical shells. Other possible materials include, but are not limited to: other plastics formulations to those already mentioned above, and graphite. The exact dimensions necessary to achieve an isotropic response depends, in part, on the shape and diameter/length ratio of the thermal neutron detector at the center of the assembly.

The total number of moderating shells is dictated by the energy resolution that is required by the user. Typically, the total number of shells will range from 5 to 11. In the present embodiment, 7 moderator shells are used. The larger the number of shells surrounding the counter 10, the greater the barrier of moderator between the neutron source and the counter 10. As the counter's 10 range of detection peaks at a certain neutron energy level, each successive combination of moderator thickness permits a different level of energy of neutron to be detected, as the neutrons are slowed by the moderator material to within the range of detection of the counter. The faster the neutron, the thicker the moderator material must be, relatively, to slow the neutron into the detection range of the counter.

In one embodiment of the invention, the neutron spectrometer is limited in sensitivity to neutrons of a maximum energy of approximately 20 MeV. One skilled in the art would appreciate that in another embodiment the sensitivity of the invention can be extended beyond the 20 MeV to approximately 1 GeV of energy by surrounding the detector and moderator with embedded shells of high atomic number elements such as copper, lead and tungsten or gold or any other material with high energy response enhancing properties. In this embodiment, one or more of the shells may be made of, or coated with, a high atomic number element such as copper, lead, tungsten or gold, for instance.

Some example configurations will consist of the following: (1) thermal neutron counter 10 without moderator, for the preferential detection of neutrons at thermal energies near 25 meV; (2) thermal neutron counter 10 surrounded by the first moderating shell 30, for the preferential detection of neutrons peaked at 1 eV; and (3) thermal neutron counter 10 surrounded by the first moderating shell 30, as well as the second moderating shell 50 and lid 60, for the detection of neutrons peaked near 10 eV. The assembly of the shells, and collection of the neutron data by the counter 10, is continued in this fashion until a moderating assembly is obtained where the detector response is peaked at neutron energies in the MeV region.

The neutron spectrometer in the preferred embodiment provides for the 8 configurations described below. The neutron energy response curve, for every configuration, is shown in FIG. 2.

Configuration 1 (C-1): thermal neutron counter 10 alone
Configuration 2 (C-2): Configuration C-1 inside first shell 30
Configuration 3 (C-3): C-2 inside second shell and lid 50, 60
Configuration 4 (C-4): C-3 inside third shells and lid 70, 80
Configuration 5 (C-5): C-4 inside fourth shell and lid 90, 100
Configuration 6 (C-6): C-5 inside fifth shell and lid 110, 120
Configuration 7 (C-7): C-6 inside sixth shell and lid 130, 140
Configuration 8 (C-8): C-7 inside seventh shell and lid 150, 160

Figure 2:
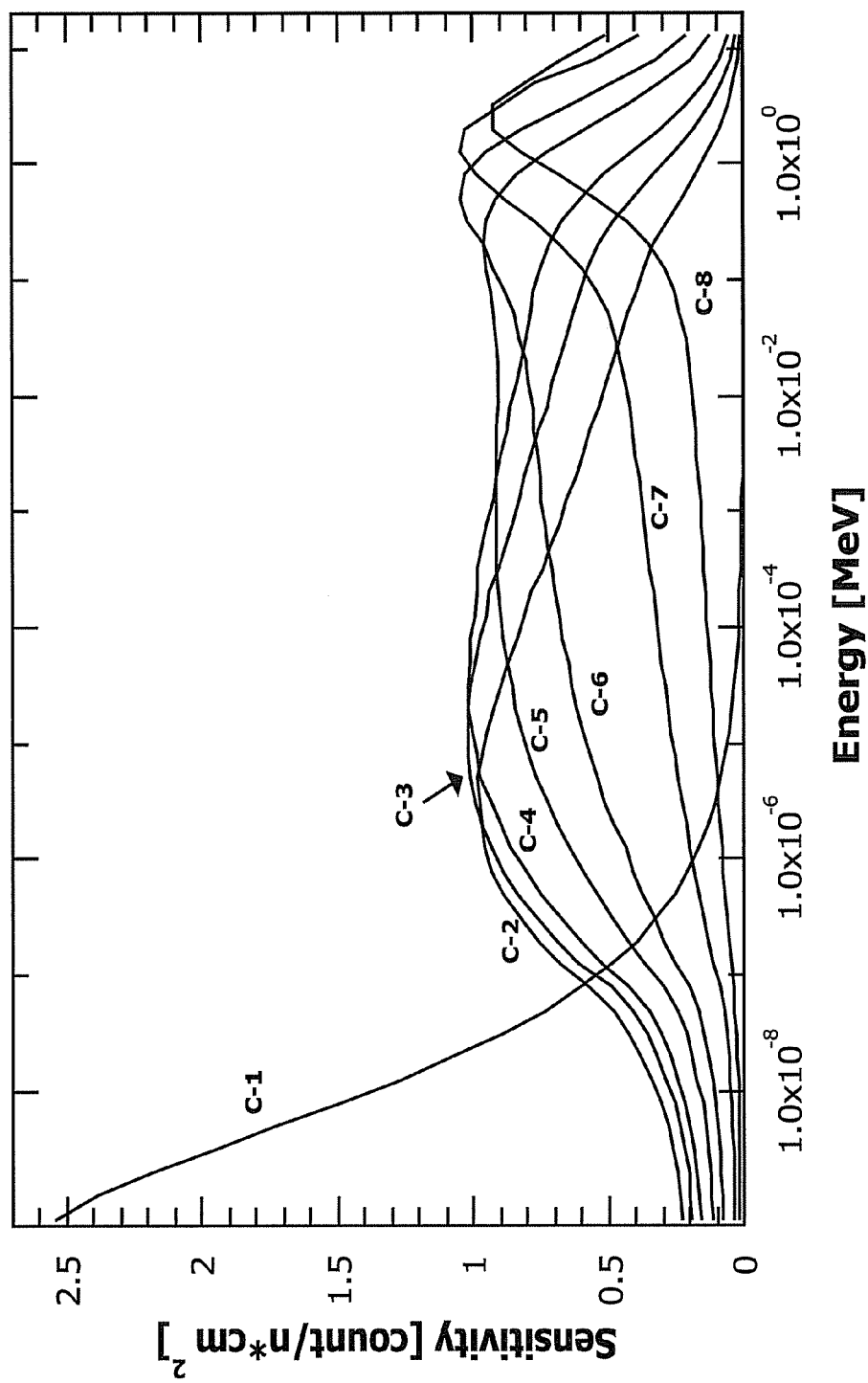
FIG. 2 is the response function for the 8 configurations of moderator and spectrometer, according to one embodiment of the present invention.
Figure 3:
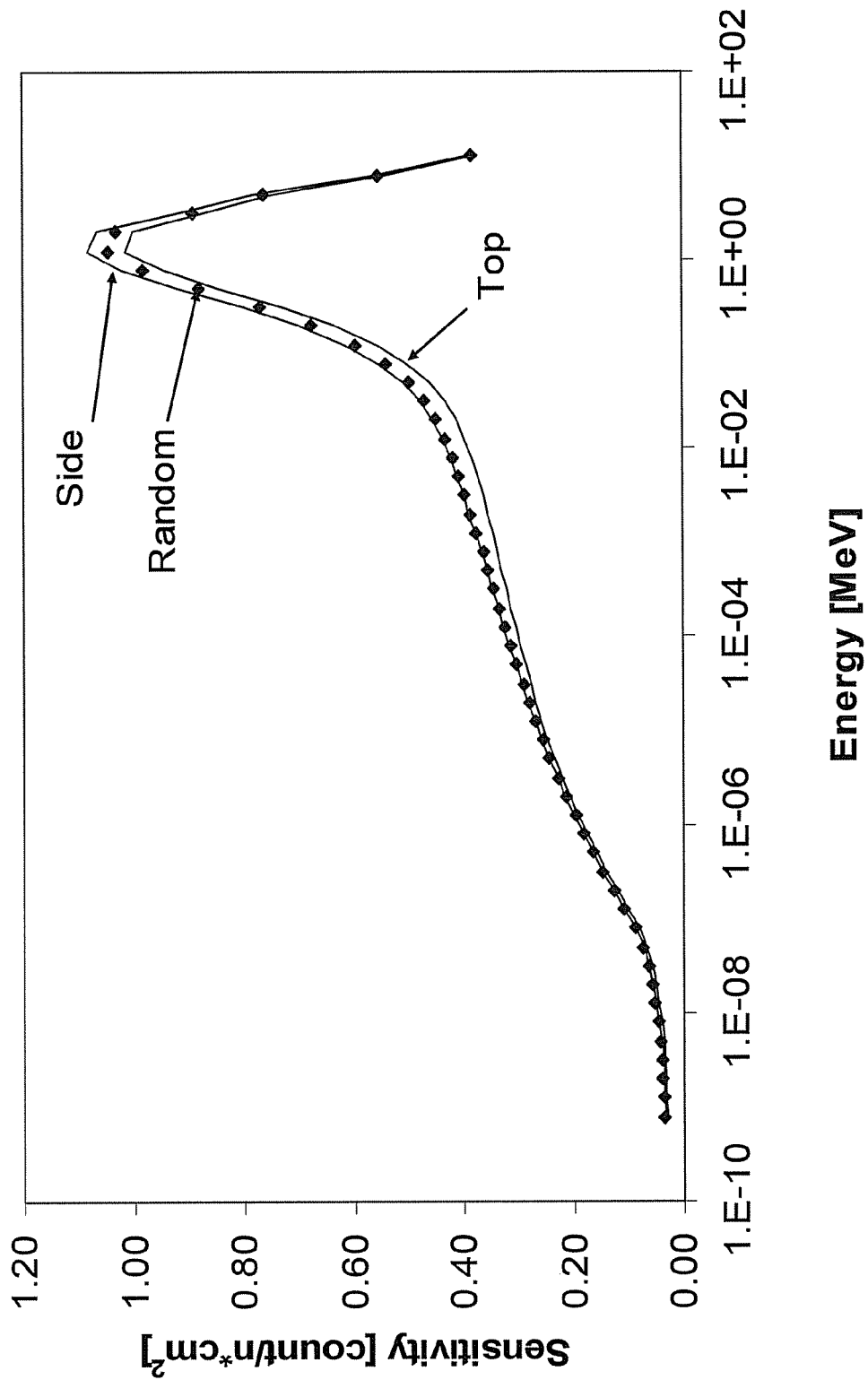
FIG. 3 is the response of the largest cylindrical moderating shell as a function of angle of incidence of the radiation according to one embodiment of the present invention.

Each configuration provides a different neutron energy response as a function of energy as shown in FIG. 2. The larger configurations, those with the larger amount of moderator, provide an enhanced response to higher energy neutrons.

At a measurement location, the system is used to count neutrons for a preset counting time for each of the 8 configurations described above. This yields 8 data points from which an energy spectrum in 50 energy groups, from thermal to 20 MeV, is extracted. The proposed neutron spectrometer may make use of an automated or semi-automated data analysis method, using a computer and spectrum unfolding software, thus enhancing further the usefulness of the neutron spectrometer for field measurements. The analysis may also be performed entirely manually or by means of a computer aiding in the manual analysis.

Figure 4:
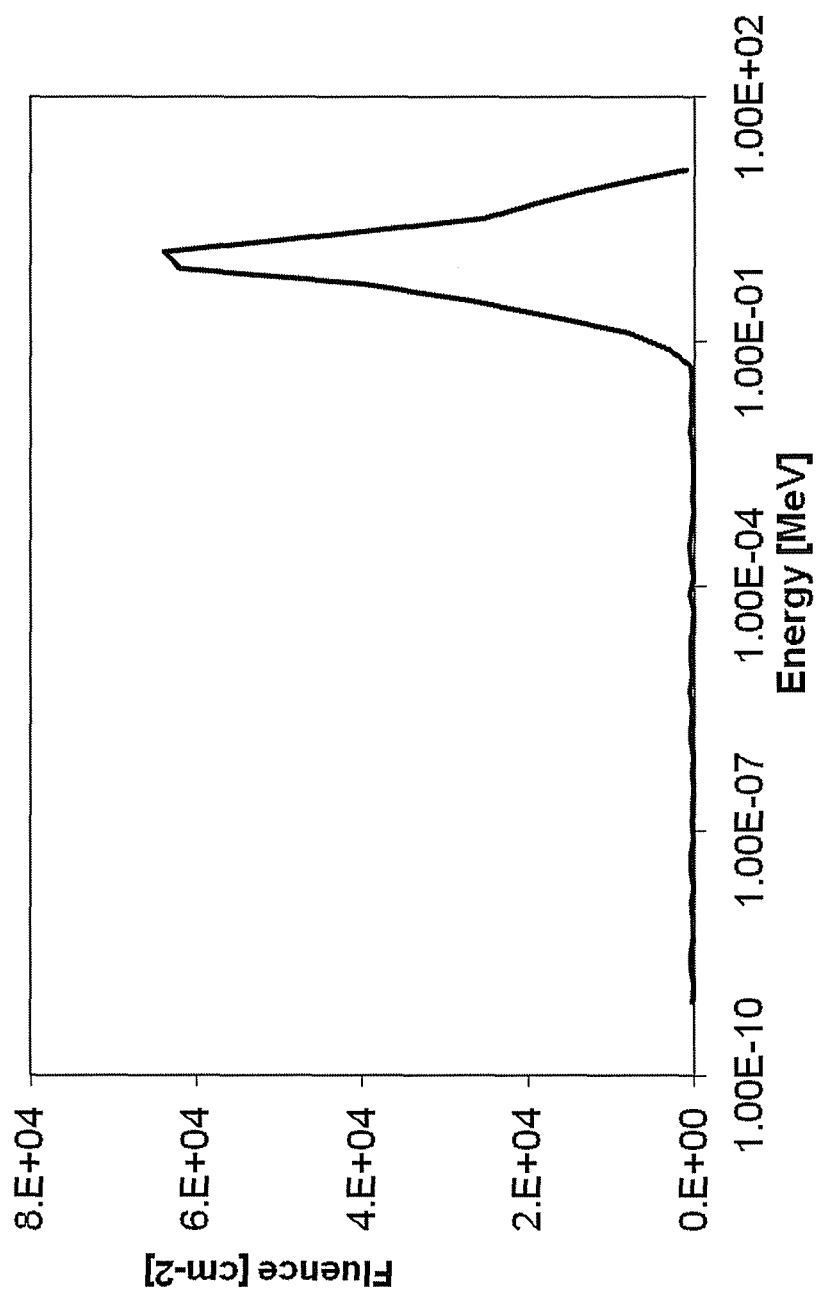
FIG. 4 is a $^{252}$Cf fission neutron energy spectrum unfolded from the 8 data points.
Figure 5:
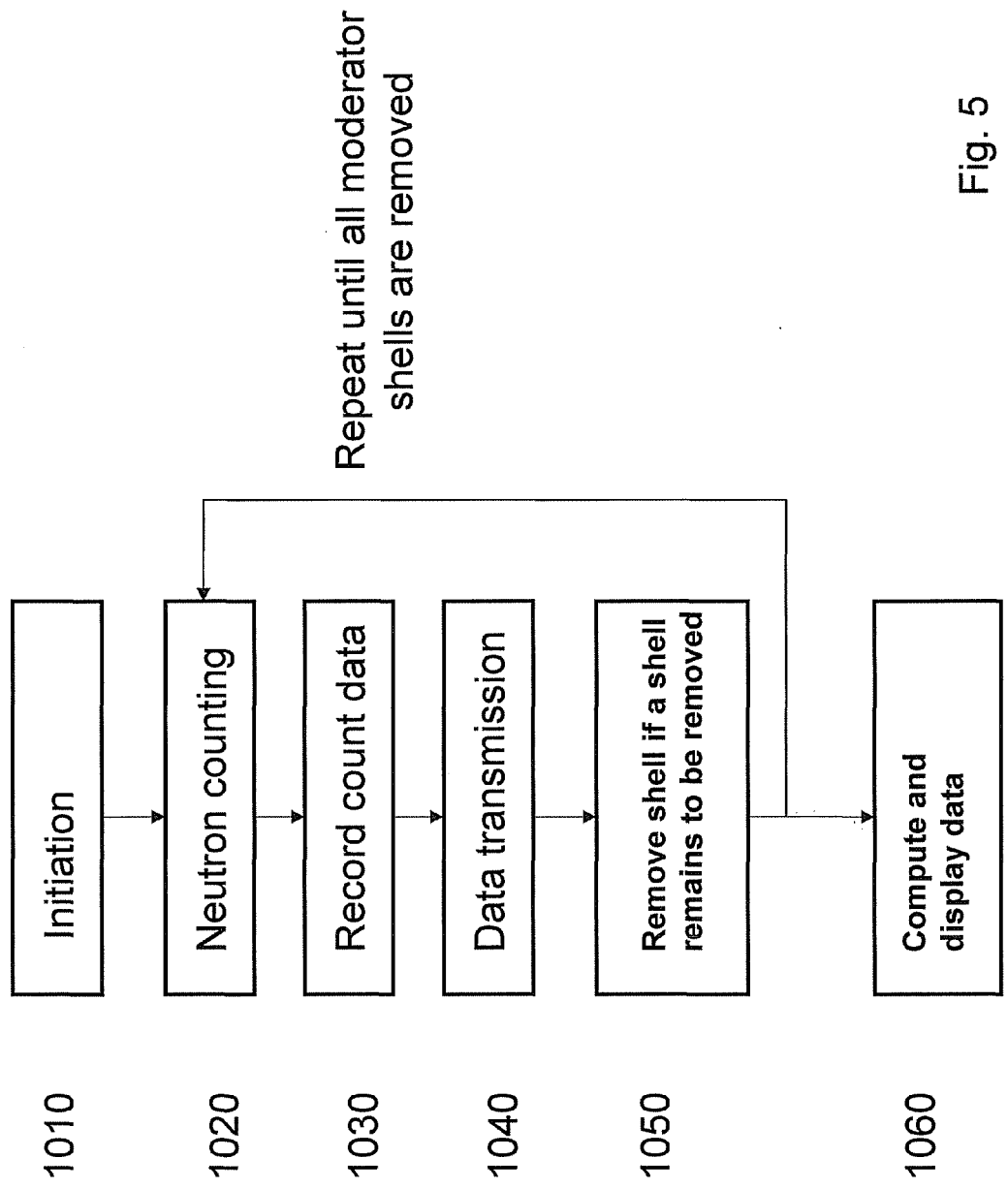
FIG. 5 is a flowchart showing the steps of a method of use of the invention, according to one embodiment of the present invention.

With reference to FIG. 1 and according to one embodiment of the present invention, in an operational setting the neutron spectrum measurement method proceeds as follows. The thermal neutron counter 10 resides at the centre of the multiple shell and lid assembly, described above. A cable 20 connects the thermal neutron counter 10 to external amplification electronics (not shown). The electronics (not shown), in turn, connected to a pulse counter and a computer (not shown). In step 1010 the system is initiated; the counter 10 is reset and prepared for acquiring measurements, the electronics and computer are prepared to accept data collected by the counter 10, and all the moderating shells are assembled and embedded within one another. Once initiation 1010 is completed, the counter 10, which at this point in the present embodiment is within all 7 shells, proceeds to count neutrons as step 1020. The faster the neutron, the thicker the moderator material must be, relatively, to slow the neutron into the detection range of the counter. Therefore, with the largest number of shells around it, the counter will be recording the fastest neutrons that are measurable by the neutron spectrometer, using only polyethylene moderating shells. The counter 10 counts neutrons for the duration of a counting period. At the end of the counting period, the count data result is recorded in step 1030 and transmitted in step 1040 to the computer (not shown). The seventh moderator shell 150 and lid 160 are then removed in step 1050. Once the seventh shell 150 and lid 160 are removed, the method returns to step 1020, the counter 10 again counts the number of neutrons detected for the duration of a counting period, this time with the combination of all shells surrounding it, missing the seventh moderator shell 150 and lid 160, which have been removed. The count data is recorded in step 1030, and the data is transmitted to the computer in step 1040. One skilled in the art would know that the data may be stored within the counter and transmitted after the counting is complete, before step 1060. Once again a shell, this time the sixth moderator shell 130 and lid 140 are removed in step 1050. Steps 1020 to 1050 are repeated, through the fifth, fourth, third and second shell and lid combinations, until the first moderator shell 30 is removed in step 1050, and the counting is then finally performed with a bare, uncovered thermal neutron counter 10, in steps 1020 through 1040. Step 1050 is not possible to perform in this iteration, since there is no further moderator shell to remove. The process would, as described above, resemble the disassembly of a "Russian doll", with the largest moderator shells progressively being removed from the spectrometer between measurements. In step 1060 the computer computes the data points and displays the data for the user. The number of data points would equal the number of cylindrical shells in the system plus the counts for the bare counter. A data analysis program would make use of individual response functions, such as those shown in FIG. 2. One skilled in the art would know that an additional measurement may be taken with the bare detector 10 surrounded by a foil of thermal neutron absorbing cadmium to provide an additional data point on the thermal neutron component of the field, or to ensure the functionality of the detector 10. The result of the analysis is an energy spectrum consisting of many tens of energy bins. As an example, FIG. 4 shows the Cf-252 fission neutron spectrum "unfolded" into 50 energy bins. The data may be manipulated on its own or with other data, using statistical software, to produce various statistical and dosimetric outputs, such as variation over time, and dose equivalent rates.

One skilled in the art would appreciate that the order of the steps making up the method may be reversed, and still fall within the scope of the present invention. In fact, any order of shell configurations may be used, so long as the counter 10 is able to count the number of neutrons detected for the duration of a counting period. In the preferred embodiment, all shell combinations would produce measurements, and a measurement would be taken with the bare counter 10, however, a smaller number of shell combinations may be used (for example, 11 shells, 9 shells, 7 shells, 5 shells, 3 shells and 1 shell) and produce a less accurate count in that there are fewer data points, and a larger range of neutron energies are extrapolated from the known data.

Many modifications and other embodiments of the invention will come to the mind of a person skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

The invention claimed is:

1. A neutron spectrometer, comprising
   a. a thermal neutron counter;
   b. two or more moderator shells, each moderator shell progressively smaller and adapted to fit in a nested manner within the next-larger moderator shell;
   c. two or more moderator lids, each adapted to mate to and close a corresponding moderator shell and of the same diameter as said moderator shell;
   wherein each of the moderator shells fit in a nested manner within the next-larger shell, each moderator shell being closed by its corresponding moderator lid, and the proportional counter being positioned inside the smallest of the two or more moderator shells.

2. The neutron spectrometer of claim 1 wherein said moderator shells are formed in a hollow cylinder form, and said moderator lids are formed in a disc form.

3. The neutron spectrometer of claim 2 wherein the largest moderator shell is between 15 and 40 cm in diameter and 15 to 40 cm in height.

4. The neutron spectrometer of claim 2 wherein the largest moderator shell is 22 cm in diameter and 22 cm in height.

5. The neutron spectrometer of claim 1 wherein the number of moderating shells ranges from 5 to 11.

6. The neutron spectrometer of claim 1 wherein said thermal neutron counter has a sensitivity between 1 to 100 count per second for a thermal neutron fluence rate of 1 neutron per $cm^2$ per second (1 to 100 cps/nv).

7. The neutron spectrometer of claim 1 further comprising a cable wherein the cable connects to the said thermal neutron counter and passes through said two or more moderator shells, and said cable is adapted to transmit signal impulses to signal processing electronics.

8. The neutron spectrometer of claim 1 wherein said moderator lids and walls of said moderator shells have a uniform thickness and are made of a material selected from the group consisting of polyethylene, polyoxymethylene, nylon, plastic, and graphite.

9. The neutron spectrometer of claim 1 wherein said moderator shells and said moderator lids are made of polyethylene having a density of 0.92 and 0.96 g/cc.

10. The neutron spectrometer of claim 1 wherein a one or more of said moderator shells are made of a high atomic number metal.

11. A method of using the neutron spectrometer of claim 1, comprising the following steps:
    a. a proportional counter and a pulse counter are initiated and the neutron spectrometer is assembled;
    b. said proportional counter counts neutrons for the duration of a counting period;
    c. a count data result is recorded;
    d. the count data result is transmitted to a computer;
    e. a moderating shell is removed from said neutron spectrometer;
    f. steps b through e are repeated until no further moderating shell remains to be removed from said neutron spectrometer; and
    g. said computer calculates the processes the data points and displays a result.

12. A neutron spectrometer, comprising
    a. a proportional counter;
    b. 7 cylindrical moderator shells, each said moderator shell progressively smaller and adapted to fit in a nested manner within the next-larger moderator shell;
    c. 7 disc-shaped moderator lids, each said moderator lid progressively smaller and adapted to close its corresponding moderator shell;
    wherein the proportional counter is positioned inside the smallest of the 7 moderator shells, each of the moderator shells is closed by its corresponding moderator lid and the combination of moderator shell and moderator lid is positioned in a nested manner within the next-larger moderator shell and moderator lid.

13. The neutron spectrometer of claim 12 wherein said proportional counter has a sensitivity between 1 to 100 cps/nv.

14. The neutron spectrometer of claim 12 wherein said moderator lids and walls of said moderator shells have a uniform thickness and are made of a material selected from the group consisting of polyethylene, polyoxymethylene, nylon, plastic, and graphite.

15. The neutron spectrometer of claim 12 wherein the largest moderator shell is between 15 and 40 cm in diameter and 15 to 40 cm in height.

* * * * *